US007946114B2

(12) United States Patent
Kauss

(10) Patent No.: US 7,946,114 B2
(45) Date of Patent: May 24, 2011

(54) HYDRAULIC CONTROL SYSTEM

(75) Inventor: Wolfgang Kauss, Francheville (FR)

(73) Assignee: Bosch Rexroth AG, Stuttgart (DE)

( * ) Notice: Subject to any disclaimer, the term of this patent is extended or adjusted under 35 U.S.C. 154(b) by 414 days.

(21) Appl. No.: 11/793,232

(22) PCT Filed: Dec. 14, 2005

(86) PCT No.: PCT/DE2005/002262

§ 371 (c)(1), (2), (4) Date: Aug. 29, 2006

(87) PCT Pub. No.: WO2006/066548

PCT Pub. Date: Jun. 29, 2006

(65) Prior Publication Data

US 2008/0053081 A1 Mar. 6, 2008

(30) Foreign Application Priority Data

Dec. 21, 2004 (DE) ........................ 10 2004 061 555

(51) Int. Cl.
*F16D 31/02* (2006.01)

(52) U.S. Cl. ........................................................ 60/452

(58) Field of Classification Search ..................... 60/452
See application file for complete search history.

(56) References Cited

U.S. PATENT DOCUMENTS

| | | | | |
|---|---|---|---|---|
| 4,938,022 | A | 7/1990 | Hirata et al. | |
| 5,077,975 | A * | 1/1992 | Kauss | 60/452 |
| 5,085,051 | A | 2/1992 | Hirata | |
| 5,226,800 | A | 7/1993 | Morino | |
| 5,481,875 | A | 1/1996 | Takamura et al. | |
| 5,993,168 | A * | 11/1999 | Erkkilae et al. | 60/452 |
| 6,560,962 | B2 * | 5/2003 | Sawada et al. | 60/452 |
| 2003/0200747 | A1 * | 10/2003 | Matsumoto et al. | 60/452 |

FOREIGN PATENT DOCUMENTS

| | | |
|---|---|---|
| DE | 690 17 700 T2 | 11/1995 |
| DE | 692 25 951 T2 | 12/1998 |
| DE | 199 30 618 A1 | 1/2001 |
| DE | 100 06 659 A1 | 8/2001 |
| EP | 0 312 130 B1 | 4/1989 |
| EP | 0 493 596 B1 | 7/1992 |
| EP | 0 558 765 B1 | 9/1993 |
| JP | A-05-032457 | 2/1993 |
| JP | A-08-239685 | 9/1996 |
| JP | A 2001-193705 | 7/2001 |
| JP | A-2002-013155 | 1/2002 |
| WO | WO 98/46883 A1 | 10/1998 |

OTHER PUBLICATIONS

English-language translation of Office Action issued in Japanese Patent Application No. 2007-547166; Mar. 17, 2010.

Japanese Notification of Reasons for Refusal for JP Application No. 2007-547166, dated Nov. 10, 2010 w/English language translation.

* cited by examiner

*Primary Examiner* — F. Daniel Lopez

(74) *Attorney, Agent, or Firm* — Oliff & Berridge, PLC

(57) ABSTRACT

The invention relates to a hydraulic control system for providing at least one hydraulic consumer with a pressure medium. Said system comprises an LS pump system and a metering port for adjusting the pressure medium volume flow rate towards the consumer. The LS line is connected to a pressure medium sink via a current regulator. The invention is characterized in that the current regulator can be adjusted depending on the pump rate in order to modify the pressure drop at the metering port.

9 Claims, 4 Drawing Sheets

HYDRAULIC CONTROL SYSTEM

The invention relates to a hydraulic control system for providing at least one hydraulic consumer with a pressure medium.

Such control arrangements described, for instance, in DE 199 30 618 A1 comprise a variable-displacement pump or a constant-displacement pump including a bypass pressure regulator which are controlled in response to the maximum load pressure of the operated hydraulic consumers such that the pump pressure is above the maximum load pressure by a predetermined pressure difference. The pressure medium flows towards the hydraulic consumers via adjustable metering ports which are arranged between a supply line branching off the variable-displacement pump and the hydraulic consumers. It is achieved by pressure regulators allocated to the metering ports that with a sufficiently supplied quantity of pressure medium a predetermined pressure difference is formed at the metering ports independently of the load pressures of the hydraulic consumers so that the quantity of pressure medium flowing towards the respective consumer is only dependent on the opening cross-section of the respective metering port. The pump regulator of the variable-displacement pump or the bypass pressure regulator of the constant-displacement pump is adjusted such that it supplies the required quantity of pressure medium—this is referred to as demand-responsive flow regulation.

In the case of LUDV (load-pressure independent flow distribution) systems the individual pressure regulator allocated to the metering port is usually controlled in the closing direction by the maximum load pressure of the hydraulic consumers and in the opening direction by the pressure downstream of the metering port. If in the case of a simultaneous operation of plural hydraulic consumers the metering ports are opened so far that the quantity of pressure medium supplied by the pump is smaller than the demand-responsive quantity, the quantities of pressure medium flowing towards the individual hydraulic consumers are reduced at equal ratios independently of the respective load pressure of the hydraulic consumers. Such a LUDV control represents a special case of a LS control. It is referred to a mere LS control, when in the closing direction the pressure upstream of the metering port and in the opening direction the pressure downstream of the metering port is applied to the individual pressure regulator, wherein, when the metering port is arranged downstream of the pressure regulator, said pressure then corresponds to the individual load pressure; if plural hydraulic consumers are operated simultaneously and the quantity of pressure medium supplied from the variable-displacement pump is not sufficient, only the quantity of pressure medium flowing towards the hydraulic consumer having the maximum load pressure is reduced. In the known solution a LS line conveying the highest load pressure is connected to the tank via a current control valve.

Such hydraulic control systems are employed, for instance, for the supply of the consumers of construction machines, e.g. a slewing mechanism, a boom, a shovel bucket or a dipper arm of a mobile working machine. In such working machines the pump is frequently operated by an internal combustion engine, said pump being allocated to all consumers. The size of the pump is designed to correspond to the engine power available, the individual movements of the consumers being tuned to each other to a great extent in respect of a good controllability. In some cases, for instance when operating the slewing mechanism, the entire pump volume flow is required for one single movement. Accordingly, the maximum opening cross-section of the metering port must be designed to be adapted to this quantity of pressure medium.

If the opening cross-section of the metering port is designed for the entire pump quantity at maximum engine speed, the control range of the slide valve is not completely exploited at a reduced or minimum engine speed. For such a quantity of pressure medium the metering port has to be opened merely to a part of the maximum opening cross-section so that only a partial stroke of the metering port is available for the control of this quantity of pressure medium. Accordingly, the resolution of the metering port is comparatively small so that frequently the accuracy of the consumer movement at low velocity does not meet the requirements.

In the publications DE 100 06 659 A1, U.S. Pat. No. 5,085,051, U.S. Pat. No. 5,481,875 and U.S. Pat. No. 5,226,800 LS control systems are described in which the consumers are supplied with pressure medium via a variable-displacement pump whose pump capacity can be adjusted in response to the maximum load pressure. In these known solutions an additional power can be electronically applied to the pump regulator of the variable-displacement pump so that the pressure drop controlled by the pump regulator is reduced and the pressure medium volume flow supplied by the variable-displacement pump is appropriately varied. This electronic adjustment by means of a solenoid is only suited for the pump regulator of a variable-displacement pump, however, because the greater forces required for the bypass pressure regulator of a constant-displacement pump can hardly be dominated by a solenoid. Moreover, for the control of the required proportional magnet a complicated electronic system is necessary which is not provided in many machines.

In LS systems furthermore the engine speed of the pump drive has only little influence on the speed of the consumers, because the volume flow towards the consumer is restricted by the metering port of the allocated control slide valve in the case of the pressure drop controlled by the pressure regulator.

The object underlying the invention is to provide a hydraulic control system by which a sufficiently exact control of a consumer is made possible even with a low pump capacity of a variable-displacement pump or a constant-displacement pump.

This object is achieved by a control system comprising the features of claim 1.

The control system according to the invention comprises a pump arrangement controllable in response to the load pressure of a consumer and a metering port for adjusting the pressure medium volume flow rate towards the consumer. The load pressure is tapped off via a LS line connected to a pressure medium sink, for instance a tank, by means of a current regulator. In the solution according to the invention the current regulator can be adjusted in response to the pump capacity, preferably to the pump rate. Thus a volume flow dependent on the pump capacity or pump rate flows off the load reporting line. Said volume flow rate is increased with a decreasing speed so that, due to the pressure drop in the load reporting line, a lower pressure is reported to the pump and the latter is appropriately adjusted. The pressure drop above the metering port and thus the pressure medium volume flow rate flowing above the metering port is reduced so that the metering port has to be further opened and the control range of the metering port is better exploited.

This concept according to the invention can be used in LUDV systems as well as in said LS systems ($\Delta p$ applied to the pressure regulator via the metering port) and in control systems in which merely one consumer is controlled via a metering port (without pressure regulator).

In LUDV systems a LUDV pressure regulator is provided having an orifice by which then a constant larger pressure gradient is generated when controlling the current regulator to open, whereby—as described above—the pressure drop at the metering port is reduced. In LS systems such orifice is not necessary.

According to the invention, it is preferred when the current regulator is driven in response to the engine speed of a pump drive. Said engine is an internal combustion engine in a preferred embodiment.

In an especially preferred embodiment in the LS line downstream of the current regulator an additional nozzle is disposed via which the above-described pressure drop can be generated which then results in reducing the volume flow rate via the metering port. This additional port permits to control plural consumers of a control system in a more sensitive manner. Without said additional nozzle, on the other hand, only the consumer having the highest load pressure can be controlled more sensitively, because only in case of the latter the fully opened individual pressure regulator thereof does not influence the pressure downstream of the metering port, because said pressure corresponds to the highest load pressure or the pressure adjusted in the LS line. If the pump pressure varies, then also the pressure difference above the metering port varies. In the consumers having a lower load pressure, however, the individual pressure regulators downstream of the metering ports adjust the lower pressure prevailing in the LS line. Accordingly, in the lower load consumers the pressure is varied upstream and downstream of the metering ports to the same extent, when the current regulator is adjusted—the pressure difference above said metering ports of the lower load consumers then remains equal.

In a variant of the invention, the pressure prevailing in the LS line is restricted via a LS pressure-limiting valve. The latter can be arranged either downstream or upstream of the current regulator. A LS pressure-limiting valve arranged downstream of the additional nozzle limits the pressure reported to the pump. In the LS line upstream of said additional nozzle and thus at the rear sides of all individual pressure regulators a somewhat higher pressure is then prevailing which is controlled by the individual pressure regulators downstream of the metering port. The pump, on the other hand, exceeds the lower pressure predetermined by the pressure-limiting valve only by the standard $\Delta p$. Thus the pressure difference above all metering ports becomes smaller—in some cases even zero. It is possible that not only the consumer provided at the stop but all consumers are stopped.

In the case in which the LS pressure-limiting valve is connected to the LS line upstream of the additional nozzle, the LS pressure-limiting valve limits the pressure at the rear sides of the individual pressure regulators. The pump pressure is higher by a predetermined value than the pressure at the rear sides of the individual pressure regulators by the additional nozzle, the adjustment of the current regulator and the adjustment of the pump regulator or the bypass pressure regulator (constant-displacement pump) so that the pressure difference above the metering ports of the lower load consumers is maintained, even if a consumer abuts against a stop.

The control system according to the invention is employed in an especially advantageous manner in a construction machine, for instance an excavator, wherein a slewing mechanism is to be displaced at a comparatively low velocity.

Other advantageous further developments of the invention are the subject matter of further subclaims.

Hereinafter a preferred embodiment of the invention is illustrated in detail by way of schematic drawings, in which FIG. 1 shows a hydraulic circuit diagram of a LUDV control system of a mobile working machine;

Figure 1:
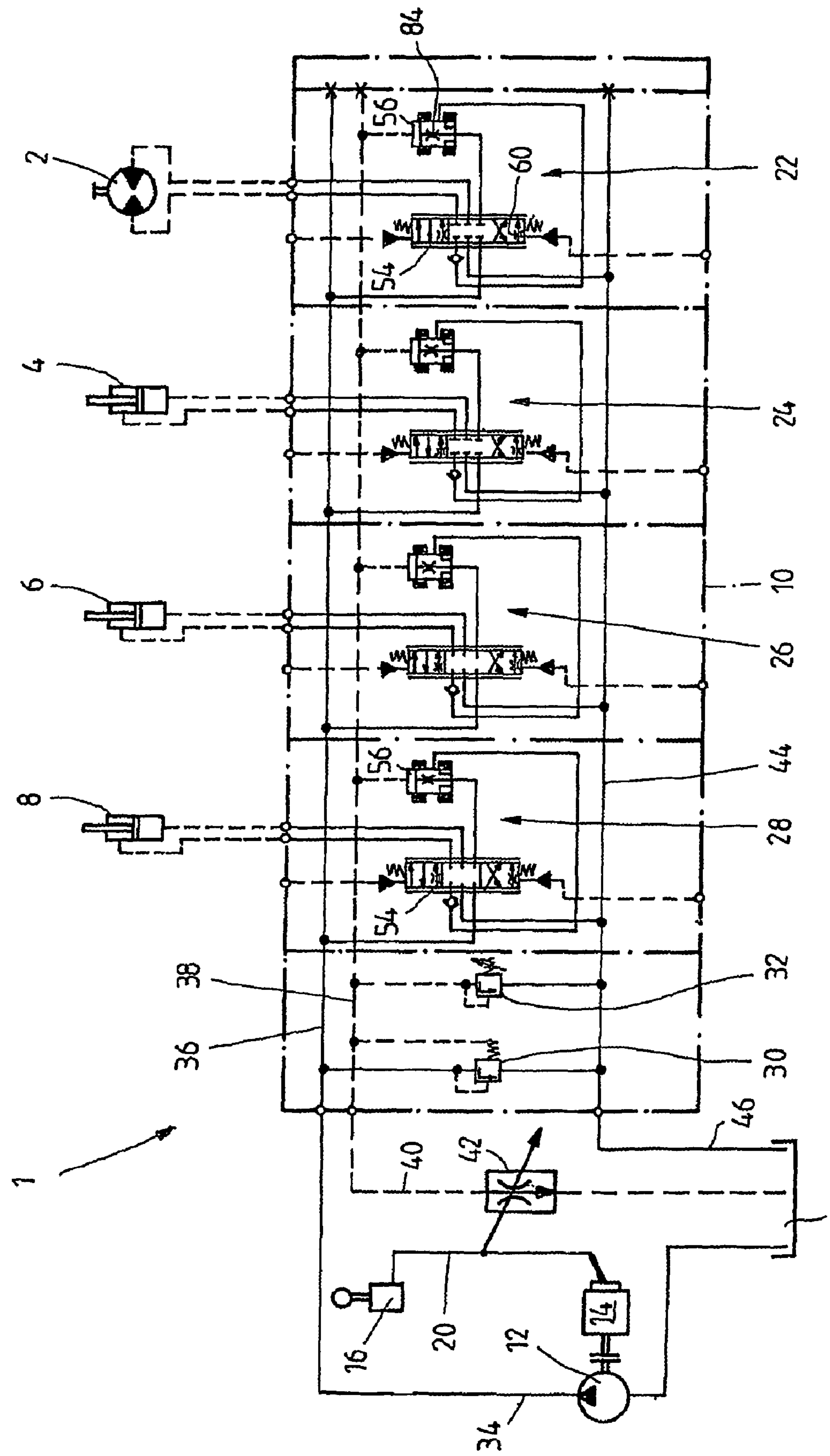

In FIG. 1 a circuit diagram of a control system 1 working according to the LUDV principle is represented as it is employed in a construction machine, for instance an excavator. By such a LUDV control system 1 consumers of the excavator, such as the cylinders or hydraulic motors of a slewing mechanism 2, a shovel bucket 4, a dipper arm 6 and a boom 8 are provided with pressure medium in response to the control of a directional control valve block 10. In the present embodiment the pressure medium is conveyed by a constant-displacement pump 12 driven by an internal combustion engine 14. The internal combustion engine 14 is controlled by means of an actuating lever (accelerator lever/accelerator pedal) 16 which is operatively connected via a throttle control cable 20 to the engine 14 in order to adjust the speed thereof. The mobile control block 10 is composed of a plurality of directional control valve sections, wherein a directional control valve section including a LUDV valve arrangement 22, 24, 26 and 28, resp., is allocated to each of the consumers 2, 4, 6, 8. In an input section of the mobile control block 10 a bypass pressure regulator 30 and a LS pressure-limiting valve 32 are provided.

Via the constant-displacement pump 12 pressure medium is sucked from a tank T and is conveyed via a supply line 30 to a port P of the mobile control block. A supply passage 36 by which the consumers 2, 4, 6, 8 can be supplied with pressure medium in the manner described in detail hereinafter is connected to said port P. The maximum load pressure limited by the LS pressure regulator 32 is applied to a LS passage 38 connected to a LS port of the mobile control block 10. A LS tank line 40 in which an adjustable current regulator 42 is disposed is connected to the LS port. Said current regulator 42 is adjusted via the throttle control cable 20 in such a way that when the speed of the engine 14 is reduced the opening of the current regulator 42 is enlarged. Thus, via said current regulator 42 a comparatively small control oil volume flow continuously drains towards the tank T.

The pressure medium draining from the consumers 2, 4, 6, 8 is returned to the tank T via a tank passage 44, a tank port T and a tank line 46. Further details of the circuit are shown by way of the enlarged representation in FIG. 2 which illustrates the portion at the pump side, the input section and the directional control valve section allocated to the consumer 8; the other sections have an identical structure.

Accordingly, the bypass pressure regulator 30 is arranged in a bypass passage 48 through which the supply passage 36 is connected to the tank passage 44. In the closing direction the force of a spring and the pressure prevailing in the LS passage 38, which is tapped off via a LS control passage 50, are applied to the bypass pressure regulator 30. The pressure prevailing at the input of the bypass pressure regulator 30, i.e. the pressure in the supply line 36, acts in the opening direction. The spring of the bypass pressure regulator is selected such that in the supply line 36 a pressure is adjusted which is above the load pressure in the LS passage 38 by a pump $\Delta p$ (for instance 10 bar).

The pressure prevailing in the LS passage 38 is limited to a maximum value via the LS pressure-limiting valve 32. To this effect, the adjustable force of a spring is applied to the LS pressure-limiting valve 32 in the closing direction, the pressure prevailing at the input of the LS pressure-limiting valve 32 which is connected to the LS passage 38 via a passage 52 acts in the opening direction.

Figure 2:
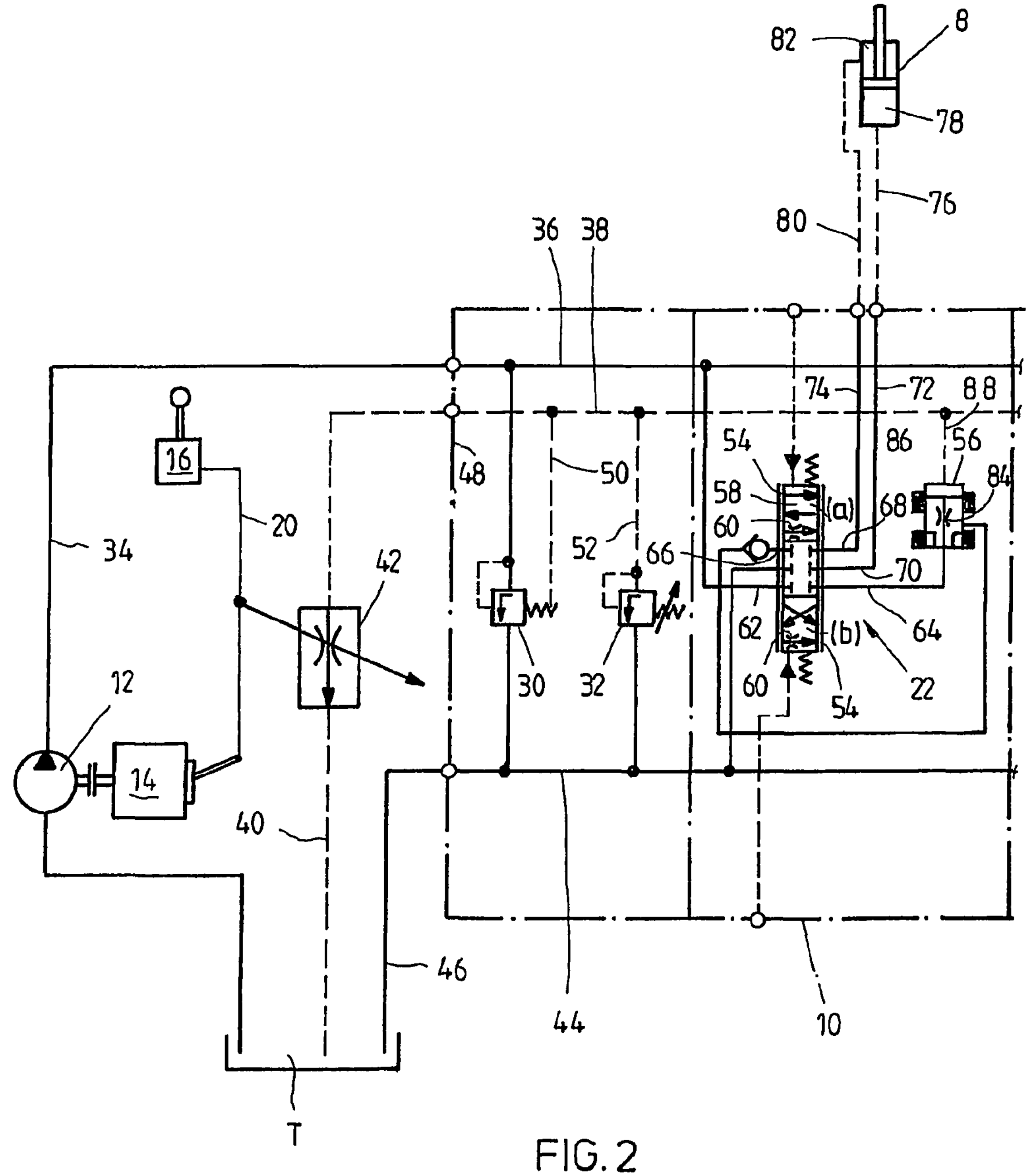
FIG. 2 is a detailed representation of the control system from FIG. 1.

The LUDV valve arrangements allocated to a respective consumer 2, 4, 6, 8—reference numeral 22 in FIG. 2—substantially consist of a continuously variable directional control valve 54 and a LUDV pressure regulator 56. In the directional control valve 54 a directional portion 58 and a velocity portion having a variable metering port 60 are formed which are constituted by the same control slide valve. When such directional control valve 54 is displaced from its spring-biased home position into one of its two lateral working positions (a), (b), pressure medium fed from the supply passage 36 flows from a supply chamber 62 via the metering port 60 into an intermediate chamber 64, from there via an opening cross-section of the LUDV pressure regulator 56 into a second intermediate chamber 66 and then via the directional portion 54 into a consumer chamber 68 or 70 and from there via an advance passage 72 and a return passage 74 to two working ports A, B of the directional control valve section. The working port A is then connected via a supply line 76 to a bottom-side cylinder chamber 78 and the working port B is connected via a return line 80 to an annular chamber of the consumer 8, i.e. to the lift cylinder operating the boom. A control piston of the LUDV pressure regulator 56 is designed such that, when said pressure regulator 56 is completely opened, it provides a throttled connection between the intermediate chamber 64 and the LS passage 38. This is the case when the allocated hydraulic consumer is solely operated or when, upon a simultaneous operation of plural hydraulic consumers, the hydraulic consumer allocated to the LUDV pressure regulator 56 has the highest load pressure. The control piston of the LUDV pressure regulator 56 is provided with an orifice 84 via which the line portion connected to the intermediate chamber 64 is connected to a rear chamber 86 of the LUDV pressure regulator 56 connected to the LS passage 38 by a reporting passage 88. Accordingly, in the closing direction the pressure prevailing in the LS pressure passage 38, as a rule the highest load pressure, and in the opening direction the pressure prevailing in the intermediate chamber 64 are applied to the control piston of the LUDV pressure regulator 56. As described in the beginning, via said LUDV valve arrangement 22 comprising the metering port 60 and the LUDV pressure regulator 84 arranged downstream thereof the pressure drop above the metering port 60 is kept constant independently of the load pressure. As regards the further function, to simplify matters it is referred to DE 199 30 618 A1.

Figure 3:
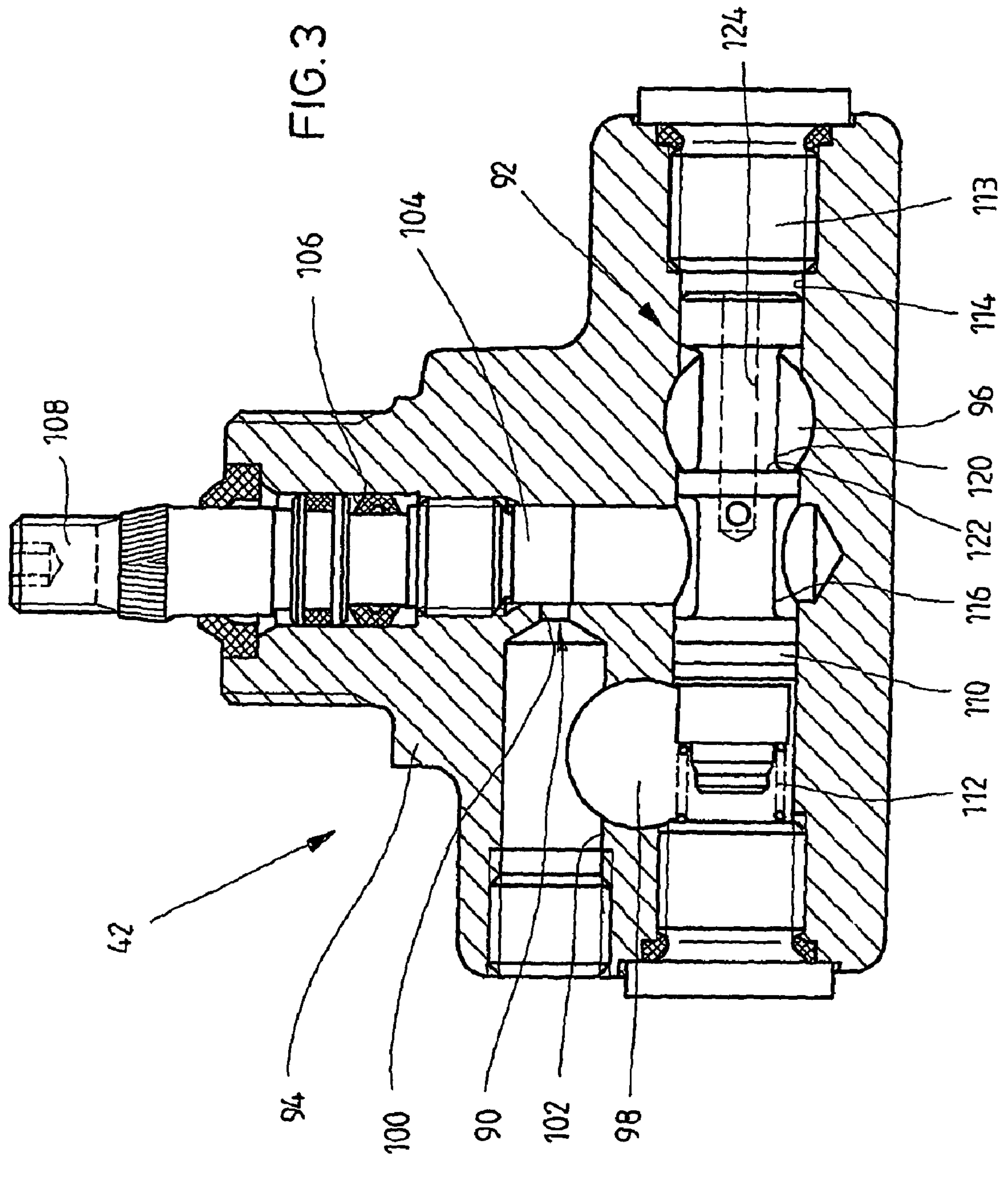
FIG. 3 is a sectional view of a current regulator from FIG. 1.

FIG. 3 shows a section across a concrete embodiment of the current regulator 42. The basic structure of such a current regulator 42 is known so that here only the component parts essential for comprehension shall be described. The current regulator 42 substantially consists of a variable metering port 90 and a pressure regulator 92 arranged upstream thereof which is shown in FIG. 3 in a regulating position. The metering port 90 and the pressure regulator 92 are accommodated in a housing 94 at which an input port 96 and an output port 98 are formed.

The metering port 90 includes an orifice bore 100 formed by a radially stepped back portion of a housing bore 102 closed on one side. The opening cross-section of the orifice bore 100 can be varied by means of a metering port slide valve 104 which is guided to be rotatable and sealed in a vertical bore 106 of the housing 94. The end portion 108 of the metering port slide valve overhead in FIG. 3 projects from the housing and is connected to the throttle control cable 20 via not represented connecting means so that an operation of the throttle control cable is converted to a rotation of the metering port slide valve 104. Thus, the latter is in the form of a rotary slide valve, the opening cross-section of the orifice bore 100 being varied corresponding to the rotation. As an alternative, the metering port slide valve 104 can also be accommodated to be axially movable.

The pressure regulator 92 includes a pressure regulator piston 110 which is biased via a pressure regulator spring 112 against a stop screw 113 screwed into a pressure regulator bore 114. In FIG. 13 the pressure regulator piston 110 is provided in one of its regulating positions. The pressure regulator piston 110 has two annular grooves 116, 120 separated from each other by a control collar forming a control edge 122. In the end face on the right at the side of the stop screw in FIG. 3 an angular bore 124 ends, which, on the other hand, ends via a short radial leg into the annular groove 116 which is hydraulically connected to the housing bore 102 and the vertical bore intersecting the pressure regulator bore 114. The input port 96 ends in the area of the annular groove 120; the output port 98 is connected, on the one hand, to the housing bore 102 and, on the other hand, to a spring chamber for the spring 112 of the pressure regulator 92. Accordingly, the force of the pressure regulator spring 112 and the pressure prevailing at the outlet 98, i.e. the pressure downstream of the orifice bore 100, is applied to the pressure regulator piston 110 in the opening direction (toward the stop screw 113) and the pressure prevailing in the chamber between the right-hand end face of the pressure regulator piston 110 and the stop screw 113, which corresponds to the pressure in the vertical bore 106 and thus upstream of the metering port 100, is applied to the pressure regulator piston 110 in the closing direction. The pressure medium volume flow through the metering port 100 is determined by the adjustment of the metering port slide valve 104, wherein the pressure drop at the metering port 90, more exactly at the orifice bore 100, is kept constant independently of the load pressure. That is to say, when the pump pressure increases, said pressure increase is restricted via the pressure regulator 92.

It is assumed that a consumer, for instance the slewing mechanism 2, is to be displaced at a comparatively low velocity and that the highest load pressure is applied to the slewing mechanism 2 or that only the slewing mechanism 92 is driven. In accordance with the LUDV principle, the LUDV pressure regulator 56 of the LUDV valve arrangement 22 (slewing mechanism 2) is then completely opened—in the load reporting passage 38 then the respective load pressure of the slewing mechanism 2 is provided. In a conventional control system comprising a current regulator whose volume flow is not adjustable, the constant-displacement pump 12 would rotate at a comparatively low velocity only due to the little slewing of the actuating lever 16 and, accordingly, only a small pressure medium volume flow would flow via the metering port 60 and the completely opened LUDV pressure regulator 56 towards the slewing mechanism 2 and from there would drain via the directional control valve 54 and the tank passage 44 towards the tank T. The control range of the valve slide of the directional control valve 54 would not be completely exploited—as described in the beginning. This is prevented according to the invention by the fact that the current regulator 42 is adjusted in response to the adjustment of the actuating lever 16 via the throttle control cable 20 such that the control oil volume flow rate is increased via the current regulator 42. Said control oil volume flow rate generates a pressure gradient above the orifice 84 of the LUDV pressure regulator so that a respective lower load pressure is reported to the bypass pressure regulator 30. Since the pump pressure continuously is above the reported pressure by the standard Δp, the pressure drop at the metering port is correspondingly varied upon the adjustment of the current regulator 42. The pressure medium volume flow rate flowing above the metering port 60 is reduced due to the small pressure difference and the driver has to readjust the metering port 60 via the not represented pilot device so that the consumer is moved at the desired low velocity—the control range of the slide valve of the directional control valve 54 is thus exploited by far better than in the prior art described in the beginning.

In the case in which, apart from the slewing mechanism 2, further consumers having a lower load pressure are controlled, the pressure difference at the metering ports allocated to said consumers remains constant—as illustrated in detail in the beginning, because downstream of the metering ports likewise the lower pressure is adjusted. Consequently, the adjustment of the current regulator 42 has no impact on the consumers having a lower load pressure in the embodiment shown in FIG. 1.

Figure 4:
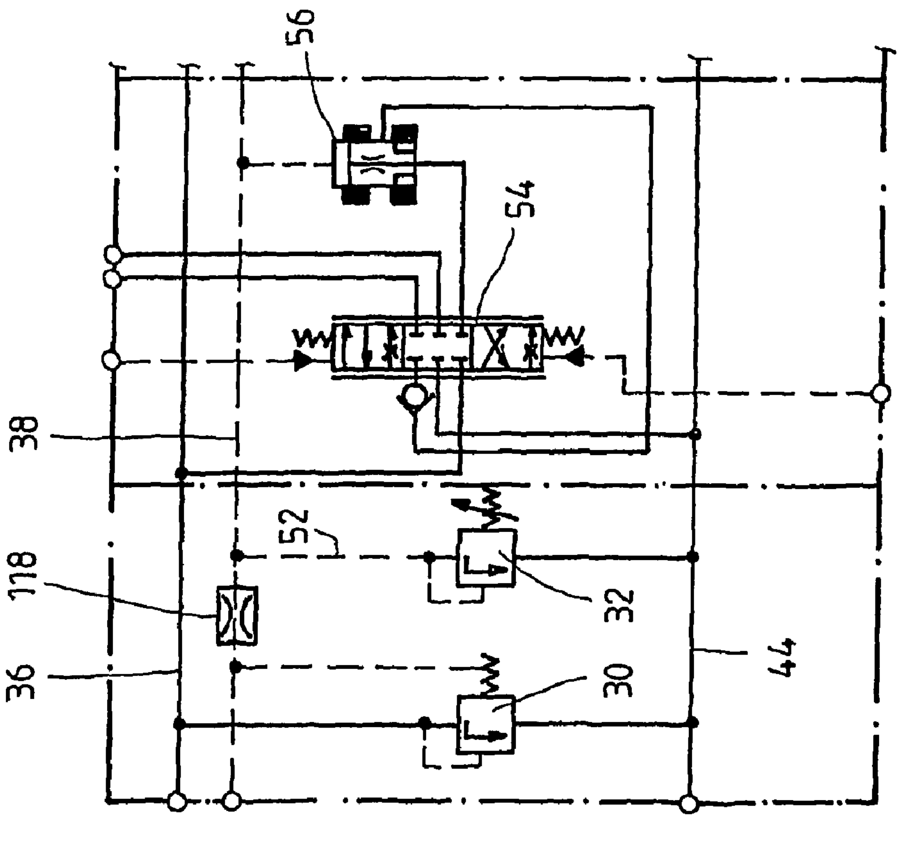
FIG. 4 shows a further embodiment of the control system from FIG. 1.

FIG. 4 shows an improved embodiment in which in the area between the current regulator 42 and the LUDV pressure regulators 56 a further nozzle 118 is provided. In the embodiment represented in FIG. 4 said nozzle 118 is disposed downstream of the branching of the passage 52 in which the LS pressure-limiting valve 32 is located. At the rear sides of the pressure regulators the highest load pressure, i.e. the pressure downstream of the further nozzle 118 is prevailing. When controlling the consumers, a constant pressure gradient is generated via said nozzle 118 in response to the adjustment of the current regulator 42 so that the pressure reported to the bypass pressure regulator 30 is lower than the highest load pressure or the load pressure of the single consumer. In the above-described manner the pump pressure is then adjusted via the predetermined standard Δp by said reduced pressure so that the pressure gradient at the metering port 60 and the pressure medium volume flow rate flowing there above are appropriately reduced. Accordingly, also the pressure drop at the metering ports of the lower load consumers is reduced so that all consumers can be controlled in a more sensitive way.

It is assumed that plural consumers are driven and one of said consumers abuts against a stop. Then the LS pressure-limiting valve 32 opens the connection to the tank passage 44 when the preset maximum load pressure is exceeded and thus the pressure upstream of the nozzle 118 is limited. Said limited pressure is prevailing in the rear chambers 86 of the LUDV pressure regulators 56. The pump pressure is then adjusted corresponding to the pressure drop above the additional nozzle, the adjustment of the current regulator and the standard Δp of the bypass pressure regulator to a higher value than it is applied to the rear sides of the LUDV pressure regulator 56 so that the pressure difference at the metering ports 60 of the lower load consumers is maintained, even if the consumer having the maximum load pressure abuts against a stop.

Figure 5:
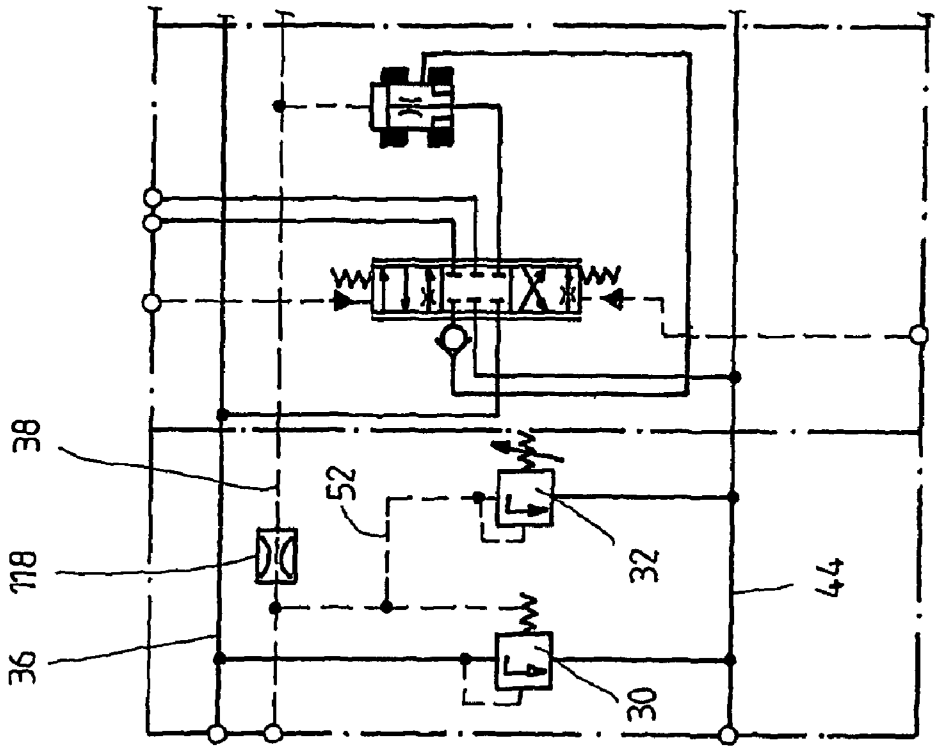
FIG. 5 shows a third embodiment of the control system according to the invention.

In the embodiment shown in FIG. 5 the additional nozzle 118 is arranged upstream of the LS pressure-limiting valve 32, i.e. the passage 52 branches off the LS passage 38 only downstream of said nozzle 118. This embodiment is not different from the afore-described embodiment when the consumers are "normally" controlled. A difference only occurs, if one of the consumers abuts against stop. In this case the control pressure reported to the pump 12 or, to put it more exactly, to the bypass pressure regulator 30 is limited by the LS pressure-limiting valve 32. In that case the pressure upstream of the additional nozzle 118 and thus the pressure prevailing in the rear chambers 86 of the LUDV pressure regulators 56 is higher than the restricted pump pressure. Said higher pressure is adjusted via the LUDV pressure regulators 56. The pump pressure is adjusted above the comparatively lower pressure predetermined by the LS pressure-limiting valve 32 only by the standard Δp, however. Thus, the pressure difference at all metering ports 60 becomes smaller, it is even possible that this pressure difference becomes zero and all consumers come to a halt.

In the above-described embodiment the control oil volume flow flowing through the current regulator 42 is returned to the tank T. On principle, however, it is also possible to supply said control oil volume flow to a control circuit and make use of it there so that the losses are reduced.

The afore-described embodiments illustrate LUDV systems. The concept according to the invention can also be employed in LS systems, however. Instead of the constant-displacement pump also a variable-displacement pump including a pump regulator which is adjusted in response to the pressure prevailing in the LS passage 38 can be used.

The invention relates to a hydraulic control system for providing at least one hydraulic consumer with a pressure medium. Said system comprises an LS pump system and a metering port for adjusting the pressure medium volume flow rate towards the consumer. The LS line is connected to a pressure medium sink via a current regulator. According to the invention, the current regulator can be adjusted depending on the pump rate in order to modify the pressure drop at the metering port.

LIST OF REFERENCE NUMERALS

1 Control system
2 slewing mechanism
4 shovel bucket
6 dipper arm
8 boom
10 mobile control block
12 constant-displacement pump
14 engine
16 actuating lever
20 throttle control cable
22 LUDV valve arrangement
24 LUDV valve arrangement
26 LUDV valve arrangement
28 LUDV valve arrangement
30 bypass pressure regulator
32 LS pressure-limiting valve
34 supply line
36 supply passage
38 LS passage
40 LS tank line
42 current regulator
44 tank passage
46 tank line
48 bypass passage
50 LS control passage
52 passage
54 directional control valve
56 LUDV pressure regulator
58 directional portion
60 metering port
62 supply chamber
64 intermediate chamber
68 consumer chamber
70 consumer chamber
72 advance passage
74 return passage

76 advance line
78 cylinder chamber
80 return line
82 annular chamber
84 orifice
86 rear chamber
88 reporting passage
90 metering port
92 pressure regulator
94 housing
96 input port
98 output port
100 orifice bore
102 housing bore
104 metering port slide valve
106 vertical bore
108 end portion
110 pressure regulator piston
112 pressure regulator spring
113 stop screw
114 pressure regulator bore
116 annular groove
118 nozzle
120 annular groove
122 control edge

The invention claimed is:

1. A hydraulic control system for providing at least one hydraulic consumer with a pressure medium, comprising:

a pump system controlled in response to a consumer load pressure tapped off via a LS line and a metering port for adjusting a volume flow rate of the pressure medium towards the consumer, wherein the LS line is connected to a tank via a current regulator, the current regulator is adjusted depending on a flow rate of the pump system, a small control oil volume flow continuously drains towards the tank via the current regulator, and a throttle is arranged in the LS line upstream of the current regulator.

2. A control system according to claim 1, wherein the pump system is driven by an engine and the current regulator is adjusted depending on the engine speed.

3. A control system according to claim 2, wherein the engine is an internal combustion engine.

4. A control system according to claim 1, comprising a LS pressure-limiting valve for limiting the LS pressure which is arranged either between the current regulator and the throttle or upstream of the throttle.

5. A control system according to claim 1, wherein an LUDV or LS pressure regulator is allocated to the metering port.

6. A control system according to claim 5, wherein the LUDV pressure regulator is provided with an orifice by which two pressure regulator chambers delimited by pressure regulator piston control surfaces are connected.

7. A control system according to claim 1, wherein the pump is a variable-displacement pump or a variable-speed constant-displacement pump comprising a bypass pressure regulator.

8. A control system according to claim 1, wherein the consumer is a slewing mechanism of a mobile working machine.

9. A control system according to claim 1, wherein the current regulator is adjusted depending on a pump rate of the pump system.

* * * * *